(12) United States Patent
Eberwine et al.

(10) Patent No.: US 9,406,180 B2
(45) Date of Patent: Aug. 2, 2016

(54) WIRELESS ACCESS CONTROL FOR ELECTRONIC LOCK

(71) Applicant: XceedID Corporation, Golden, CO (US)

(72) Inventors: Todd Eberwine, Lakewood, CO (US); Jeffrey Scott Neafsey, Golden, CO (US)

(73) Assignee: Schlage Lock Company, LLC, Indianapolis, IN (US)

( * ) Notice: Subject to any disclaimer, the term of this patent is extended or adjusted under 35 U.S.C. 154(b) by 75 days.

(21) Appl. No.: 13/968,682

(22) Filed: Aug. 16, 2013

(65) Prior Publication Data

US 2014/0049370 A1    Feb. 20, 2014

Related U.S. Application Data

(60) Provisional application No. 61/684,128, filed on Aug. 16, 2012.

(51) Int. Cl.
*G05B 19/00*   (2006.01)
*G05B 23/00*   (2006.01)
*B60R 25/00*   (2013.01)
*G08B 5/22*    (2006.01)
*E05B 49/00*   (2006.01)
*G06F 9/44*    (2006.01)
(Continued)

(52) U.S. Cl.
CPC ........ *G07C 9/00174* (2013.01); *G07C 9/00309* (2013.01); *G07C 9/00571* (2013.01); *H04L 63/10* (2013.01); *H04L 63/18* (2013.01); *H04L 67/26* (2013.01); *G07C 2009/00841* (2013.01)

(58) Field of Classification Search
CPC ........... G07C 9/00309; G07C 9/00896; G07C 9/00182; B60R 25/04; G08G 1/087; E05B 47/063; G06F 8/65

USPC ........... 340/5.61, 5.1, 4.62, 5.73, 5.28; 70/283.1; 717/168
See application file for complete search history.

(56) References Cited

U.S. PATENT DOCUMENTS 8,922,333 B1 * 12/2014 Kirkjan .............. G07C 9/00309
                                                    235/376
2006/0072755 A1    4/2006 Oskari
(Continued)

OTHER PUBLICATIONS

Inernational Search Report for PCT/US2013/055459 dated Nov. 8, 2013, 2 pages.

(Continued)

*Primary Examiner* — George Bugg
*Assistant Examiner* — Munear Akki
(74) *Attorney, Agent, or Firm* — Taft Stettinius & Hollister LLP

(57) ABSTRACT

A wireless access control system is provided including an electronic lock, a wireless transport device configured for wireless communication with a network and with the electronic lock and having access privilege to the electronic lock, and wherein the wireless transport device is configured to wirelessly receive data from the network, to wirelessly deliver the data to the electronic lock, and to verify to the network that the data has been successfully transferred to the electronic lock. In one embodiment, the wireless transport device is a cellular phone. A method is also provided including transporting data wirelessly from a network to a plurality of cellular phones having access privileges to an electronic lock, and delivering the data to the electronic lock wirelessly using at least one of the cellular phones.

15 Claims, 1 Drawing Sheet

(51) Int. Cl.
*G07C 9/00* (2006.01)
*H04L 29/08* (2006.01)
*H04L 29/06* (2006.01)

(56) References Cited

U.S. PATENT DOCUMENTS

| | | |
|---|---|---|
| 2009/0217718 A1 | 9/2009 | Porter |
| 2009/0295571 A1 | 12/2009 | Hosey |
| 2010/0075656 A1 | 3/2010 | Howarter et al. |
| 2010/0097239 A1 | 4/2010 | Campbell et al. |
| 2010/0283579 A1 | 11/2010 | Kraus et al. |
| 2011/0187505 A1 | 8/2011 | Faith et al. |
| 2011/0311052 A1 | 12/2011 | Myers et al. |
| 2012/0280783 A1 | 11/2012 | Gerhardt et al. |
| 2013/0091561 A1* | 4/2013 | Bruso ............... G06F 21/31 726/16 |
| 2013/0127593 A1* | 5/2013 | Kuenzi ............ G07C 9/00103 340/5.61 |
| 2013/0335193 A1* | 12/2013 | Hanson ............... H04W 12/06 340/5.61 |
| 2014/0051407 A1 | 2/2014 | Ahearn et al. |
| 2014/0051425 A1 | 2/2014 | Ahearn et al. |
| 2014/0052777 A1 | 2/2014 | Eberwine et al. |

OTHER PUBLICATIONS

Written Opinion of the International Searching Authority for PCT/US2013/055459 dated Nov. 8, 2013, 5 pages.

* cited by examiner

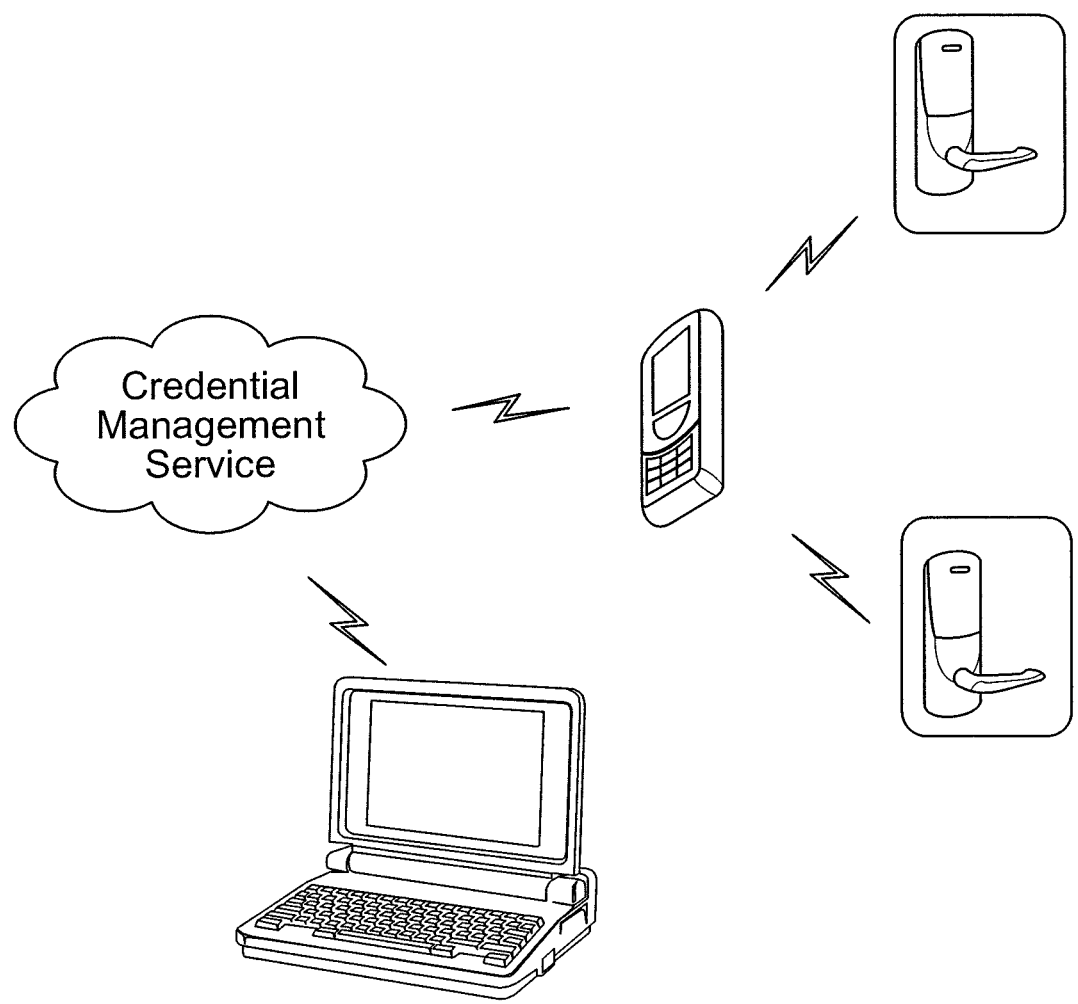

WIRELESS ACCESS CONTROL FOR ELECTRONIC LOCK

CROSS-REFERENCE TO RELATED APPLICATIONS

The present application claims the benefit of U.S. Provisional Patent Application No. 61/684,128 filed on Aug. 16, 2012, the contents of which are incorporated herein by reference in their entirety.

TECHNICAL FIELD

The present invention generally relates to an electronic lock, and more particularly, but not exclusively, to a wireless access control for the electronic lock.

BACKGROUND

Various systems may be employed for enabling access control for or providing setup updates to an electronic lock. Some existing systems have various shortcomings relative to certain applications. Accordingly, there remains a need for further contributions in this area of technology.

SUMMARY

One embodiment of the present invention is a unique access control of an electronic lock. Other embodiments include apparatuses, systems, devices, hardware, methods, and combinations for implementing access control. Further embodiments, forms, features, aspects, benefits, and advantages of the present application shall become apparent from the description and figures provided herewith.

BRIEF DESCRIPTION OF THE FIGURES

FIG. 1 is a diagram illustrating a wireless access control system for an electronic lock.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

FIG. 1 shows a wireless access control system for an electronic lock. The wireless access control system includes a host controller "credential management service" which, in the illustrated embodiment, comprises a network cloud application. The system further includes one or more cellular telephones and one or more electronic locks. In one embodiment, the system utilizes cellular telephones as a transport mechanism for access privileges and audit feedback. The cellular telephones may include NFC-enabled devices including smartphones or other wireless communication devices, to set forth just a few non-limiting examples.

The electronic locks are incorporated in doors or other restricted access devices. The cellular telephones can be configured to wirelessly communicate with the network cloud and the electronic locks. The cellular telephones can each include a memory. The electronic locks can be configured to transmit data real time back to the network cloud. The cellular telephones are configured to implement "viral data," which as used herein is data that does not pertain to a particular user.

In another embodiment, when updates need to be transmitted to a particular lock, the host controller, for example the network cloud, can transport the update to all users or cellular telephones that have access privileges to the door incorporating the lock. When the data is delivered by one of these devices, the cellular telephone reports back to the network cloud to verify the data is transferred, and then other devices can once again be updated to remove that particular update. This is expansible to any number of doors.

In a further embodiment, any alarms or audit trails from a particular lock can be transmitted immediately when someone visits the door. To ensure the data is successfully delivered to the host controller, data can be transmitted multiple times until the lock receives an update that the latest data was received at the host controller.

In another embodiment, the memory of the cellular telephone stores access privileges, and audit history data can be transported from the lock to the host controller via the cellular telephone. Each credential holder thus has virtually unlimited memory for access privileges and audit history data.

In another embodiment, data can be transmitted from the lock to the host controller immediately, providing near real-time performance.

In a further embodiment, viral data from the locks can be delivered to the network cloud immediately and viral data for the locks can be delivered to each user who has access to that lock immediately so the next user to approach the lock will deliver that data to the lock.

The access control system further provides real time control of off line locks and eliminates the need to tour the locks to provide updates to the locks or gather audit history from the locks.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A wireless access control system, comprising:
   an electronic lock;
   a plurality of wireless transport devices configured for wireless communication with a network and with the electronic lock, each of the plurality of wireless transport devices having access privilege to the electronic lock; and
   wherein each of the plurality of wireless transport devices is configured to wirelessly receive viral data for the electronic lock from the network, to wirelessly deliver the viral data to the electronic lock, and to verify to the network that the viral data has been successfully transferred to the electronic lock, wherein the viral data is an update to the electronic lock that does not pertain to a particular wireless transport device and the viral data is delivered to the electronic lock from a next one of the plurality of wireless transport devices that approaches the electronic lock after the viral data is received by the plurality of wireless transport devices, and further wherein in response to the next one of the plurality of wireless devices verifying to the network that the viral data has been successfully transferred to the electronic lock, the plurality of wireless transport devices are further configured to be updated from the network to remove the viral data viral data including the update.

2. The wireless access control system of claim 1, wherein at least one of the plurality of wireless transport devices comprises a cellular phone.

3. The wireless access control system of claim 2, wherein the cellular phone comprises a smartphone.

4. The wireless access control system of claim 1, wherein each of the plurality of wireless transport devices includes near field communication capabilities.

5. The wireless access control system of claim 1, wherein the electronic lock is used in association with a door.

6. The wireless access control system of claim 1, wherein the network comprises a network cloud application.

7. The wireless access control system of claim 1, wherein the network comprises a credential management service.

8. The wireless access control system of claim 1, wherein the electronic lock is configured to transmit data in real time to the network via each of the plurality of wireless transport devices.

9. The wireless access control system of claim 1, wherein the viral data is delivered to the electronic lock by multiple ones of the plurality of wireless transport devices until verification is provided to the network that the viral data has been successfully transferred to the electronic lock.

10. The wireless access control system of claim 1, wherein each of the plurality of wireless transport devices is further configured to receive at least one of audit history data and alarm data from the electronic lock and to transmit the at least one of the audit history data and the alarm data to the network.

11. The wireless access control system of claim 1, wherein the electronic lock comprises an off-line electronic lock that is not directly connected to the network.

12. A method, comprising:
transporting viral data wirelessly from a network to a plurality of cellular phones having access privileges to an electronic lock, wherein the viral data includes an update to the electronic lock that does not pertain to a particular cellular phone;
delivering the viral data to the electronic lock wirelessly using a next one of the plurality of cellular phones that approaches the electronic lock after the viral data is received by the plurality of cellular phones;
verifying to the network, with the next one of the plurality of cellular phones, the successful delivery of the viral data including the update to the electronic lock; and
updating the plurality of cellular phones from the network to remove the viral data after verifying to the network the successfully delivering of the viral data including the update.

13. The method of claim 12, further comprising transmitting data in real time from the electronic lock to the network via one of the cellular phones.

14. The method of claim 12, further comprising updating the electronic lock by the delivering of the viral data from at least one of the cellular phones.

15. The method of claim 12, further comprising delivering the viral data to the electronic lock wirelessly using multiple ones of the cellular phones until verification is provided to the network from one of the cellular phones that the viral data has been successfully transferred to the electronic lock.

* * * * *